(12) United States Patent  
Filippi

(10) Patent No.: US 7,836,142 B2
(45) Date of Patent: Nov. 16, 2010

(54) SYSTEM AND METHOD FOR UPDATING A DYNAMIC DOMAIN NAME SERVER

(75) Inventor: Geoffrey George Filippi, Ashburn, VA (US)

(73) Assignee: Time Warner Cable, Inc., New York, NY (US)

( * ) Notice: Subject to any disclaimer, the term of this patent is extended or adjusted under 35 U.S.C. 154(b) by 343 days.

(21) Appl. No.: 12/035,694

(22) Filed: Feb. 22, 2008

(65) Prior Publication Data

US 2009/0216852 A1    Aug. 27, 2009

(51) Int. Cl.
 G06F 15/16   (2006.01)
 G06F 15/173  (2006.01)
 G06F 15/177  (2006.01)

(52) U.S. Cl. ................ 709/208; 709/245; 709/246; 370/230

(58) Field of Classification Search ........... 709/245, 709/246, 203–208, 217–224; 370/230
See application file for complete search history.

(56) References Cited

U.S. PATENT DOCUMENTS

| | | | |
|---|---|---|---|
| 7,203,871 B2 * | 4/2007 | Turner et al. ............... | 714/710 |
| 7,366,188 B2 * | 4/2008 | Kim ........................... | 370/401 |
| 7,529,810 B2 * | 5/2009 | Goto et al. .................. | 709/219 |
| 2002/0095484 A1 * | 7/2002 | Pagani et al. ................ | 709/220 |
| 2005/0122903 A1 * | 6/2005 | Hultgren et al. ............ | 370/230 |
| 2006/0129665 A1 * | 6/2006 | Toebes et al. .............. | 709/223 |
| 2007/0165542 A1 * | 7/2007 | Shin et al. .................. | 370/254 |
| 2007/0253377 A1 * | 11/2007 | Janneteau et al. ........... | 370/338 |
| 2007/0297430 A1 * | 12/2007 | Nykanen et al. ............ | 370/408 |
| 2008/0005290 A1 * | 1/2008 | Nykanen et al. ............ | 709/222 |
| 2008/0046593 A1 * | 2/2008 | Ando et al. ................. | 709/245 |
| 2009/0313384 A1 * | 12/2009 | Baratakke et al. ........... | 709/245 |

(Continued)

OTHER PUBLICATIONS

A. Broido, H. Shang, H. Fomenkov, Y. Hyun, and K. C. Claffy, "The Windows of Private DNS Updates," Computer Communication Review, vol. 36, pp. 93-98, Jul. 2006.

(Continued)

*Primary Examiner*—Haresh N Patel
(74) *Attorney, Agent, or Firm*—The Marbury Law Group, PLLC

(57) ABSTRACT

A system and method for synchronizing a dynamic domain name system (DDNS). Updated domain name information is received at a first datastore and sent to a second datastore. Updated domain name information is also received at the second datastore and sent to the first datastore. Either datastore determines whether the other datastore is available to receive the updated domain name information. If the receiving datastore is not available, the sending datastore waits until the receiving datastore is available. The first datastore is connected to a first master DNS server and the second datastore is connected to a second master DNS server. The first and second master servers share an IP address. When a request for domain name information is received at a router, the request is sent to a master DNS server selected from the first and second master DNS servers using the shared IP address. A master DNS server is selected to respond to the DNS request only if that master server is able to respond to the request. The requested domain name information is retrieved from the datastore connected to the selected DNS server and a response to the request for domain name information is generated.

18 Claims, 8 Drawing Sheets

U.S. PATENT DOCUMENTS

2010/0014536 A1* 1/2010 Lin et al. .................... 370/410

OTHER PUBLICATIONS

A. Sahoo, K. Kant, and P. Mohapatra, "Improving BGP Convergence Delay for Large-Scale Failures," in Dsn 2006 International Conference on Dependable Systems and Networks, Proceedings, 2006, pp. 323-332, Dec. 31.

D. Sanghi, P. Jalote, and P. Agarwal, "Using Proximity Information for Load Balancing in Geographically Distributed Web Server Systems," in Eurasia-ICT 2002: Inforamation and Communication Technology, Proceedings, vol. 2510, H.Shafazand and A. M. Tjoa, Eds., 2002, pp. 659-666, Dec. 31.

J. Hiebert, P. Boothe, R. Bush, and L. Lynch, "Determining the Cause and Frequency of Routing Instability with Anycast," in Technologies for Advanced Heterogeneous Networks, Proceedings, vol. 4311, K. Cho and P. Jacquest, Eds., 2006, pp. 172-185.

D. Katabi & J. Wroclawski "A Framework for Scalable Global IP-Anycast (GIA),"SIGCOMM Computer Commun. Rev., vol. 31, pp. 186-219, 2001.

S. L. Yu and W. L. Zhou, "An Efficient Reliable Architecture for Application Layer Anycast Service," in Distributed and Parallel Computing. vol. 3719 Berlin: Springer-Verlag Berlin Heidelberg, 2005, pp. 376-385.

S. Rewaskar and J. Kaur, "Testing the scalability of overlay routing infrastructures," in Passive and Active Network Measurement. vol. 3015 Berlin: Springer-Verlag Berlin, 2004, pp. 33-42.

S. Suzuki and M. Nakamura, "Domain Name System-Past, Present and Future," IEICE Transactions on Communications, vol. E88B, pp. 857-864, Mar. 2005.

V. Ramasubramanian, E.G. Sirer, "The Design & Implementation of a Next Generation Name Service for the Internet," SIGCOMM '04, pp. 331-342, 2004, Dec. 31.

B. C. Zhang, D. Massey, and L. X. Zhang, "Destination reachability and BGP convergence," in Globecom '04: IEEE Global Telecommunications Conference, vols. 1-6, 2004, pp. 1383-1389, Dec. 31.

C. Metz, "IP anycast—Point-to-(any) point communication," IEEE Internet Computing, vol. 6, pp. 94-98, 2002, Dec. 31.

D. Xuan, W. J. Jia, W. Zhao, and H. W. Zhu, "A routing protocol for anycast messages," IEEE Transactions on Parallel and Distributed Systems, vol. 11, pp. 571-588, 2000, Dec. 31.

E. W. Zegura, M. H. Ammar, Z. Fei, and S. Bhattacharjee, "Application-layer anycasting: A server selection architecture and use in a replicated web service," IEEE-Acm Transactions on Networking, vol. 8, pp. 455-466, 2000, Dec. 31.

M. Iqbal, I. Gondal, L. Dooley, and IEEE "Online load balancing for energy-aware anycast routing," 2006 Asia-Pacific Conference on Communication, vol. 1 & 2, pp. 581-585, 2006, Dec. 31.

V. D. Park and J. P. Macker, "Anycast routing for mobile networking," in Military Communications Conference Proceedings, 1999. MILCOM 1999. IEEE, 1999, pp. 1-5 vol. 1, Dec. 31.

W. T. Zaumen, S. Vutukury, and J. J. Garcia-Luna-Aceves, "Load-balanced anycast routing in computer networks," Iscc 2000: Fifth IEEE Symposium on Computer and Communications, Proceedings, pp. 566-574, 2000, Dec. 31.

W. W. Chu, T. W. Page, Jr., Q. Chen, A. Y. Hwang, and O. T. Satyanarayanan, "Development of a fault tolerant distributed database via inference," in Experimental Distributed Systems 1990 Proceedings, IEEE Workshop on, 1990, pp. 8-12, Dec. 31.

Y. Xia, T. Min, and W. Zhiliang, "A dynamic threshold method of clustering update messages into routing events in BGP measurements," in Broadband Convergence Networks, 2007. BcN '07. $2^{nd}$ IEEE/IFIP International Workshop on, 2007, pp. 1-5, Dec. 31.

Z. B. Mai, S. Q. Wang, D. Xuan, and W. Zhao, "Group aggregation for scalable anycast routing," 2003 IEEE International Performance, Computing, and Communications Conference Proceedings, pp. 33-40, 2003, Dec. 31.

A. Sahoo, K. Kant, and P. Mohapatra, "Speculative Route Invalidation to Improve BGP Convergence Delay Under Large-Scale Failures," in ICCCN 2006: $15^{th}$ International Conference on Computer Communications and Networks, Proceedings, W. Feng, K. Guo, and E. K. Park, Eds., 2006, pp. 461-466, Dec. 31.

J. P. Jones, D. F. Berger, and C. V. Ravishankar, "Layering Public Key Distribution Over Secure DNS Using Authenticated Delegation," 21st Annual Computer Security Applications Conference, Proceedings, pp. 369-378, 2005, Dec. 31.

C. Peng & Y. Zhou "Anycast Routing Algorithms on the Internet," International Conference on Computer Networks and Mobile Computing, 2001, pp. 362-367, Dec. 31.

S. Sarat, V. Pappas, and A. Terzis, "On the Use of Anycast in DNS," ICCCN 2006: 15th International Conference on Computer Communications and Networks, Proceedings, W. Feng, K. Guo, and E. K. Park, Eds., 2006, pp. 71-78, Dec. 31.

K.S. Trivedi, R. Vasireddy, D. Trindade, Swami Nathan, and Rick Castro, "Modeling High Availability Systems," 12th Pacific Rim International Symposium on Dependable Computing, 2006, pp. 154-164, Dec. 31.

S. Yu, W. L. Zhou, and Y. Wu, "Research on Network Anycast," Fifth International Conference on Algorithms and Architectures for Parallel Processing, Proceedings, pp. 154-161, 2002, Dec. 31.

W. Jia, G. Xu, and W. Zhao, "Integrated Fault-Tolerant Multicast and Anycast Routing Algorithms," IEE Proceedings-Computers and Digital Techniques, vol. 147, pp. 266-274, Jul. 2000.

* cited by examiner

MASTER DOWN – MODIFIED

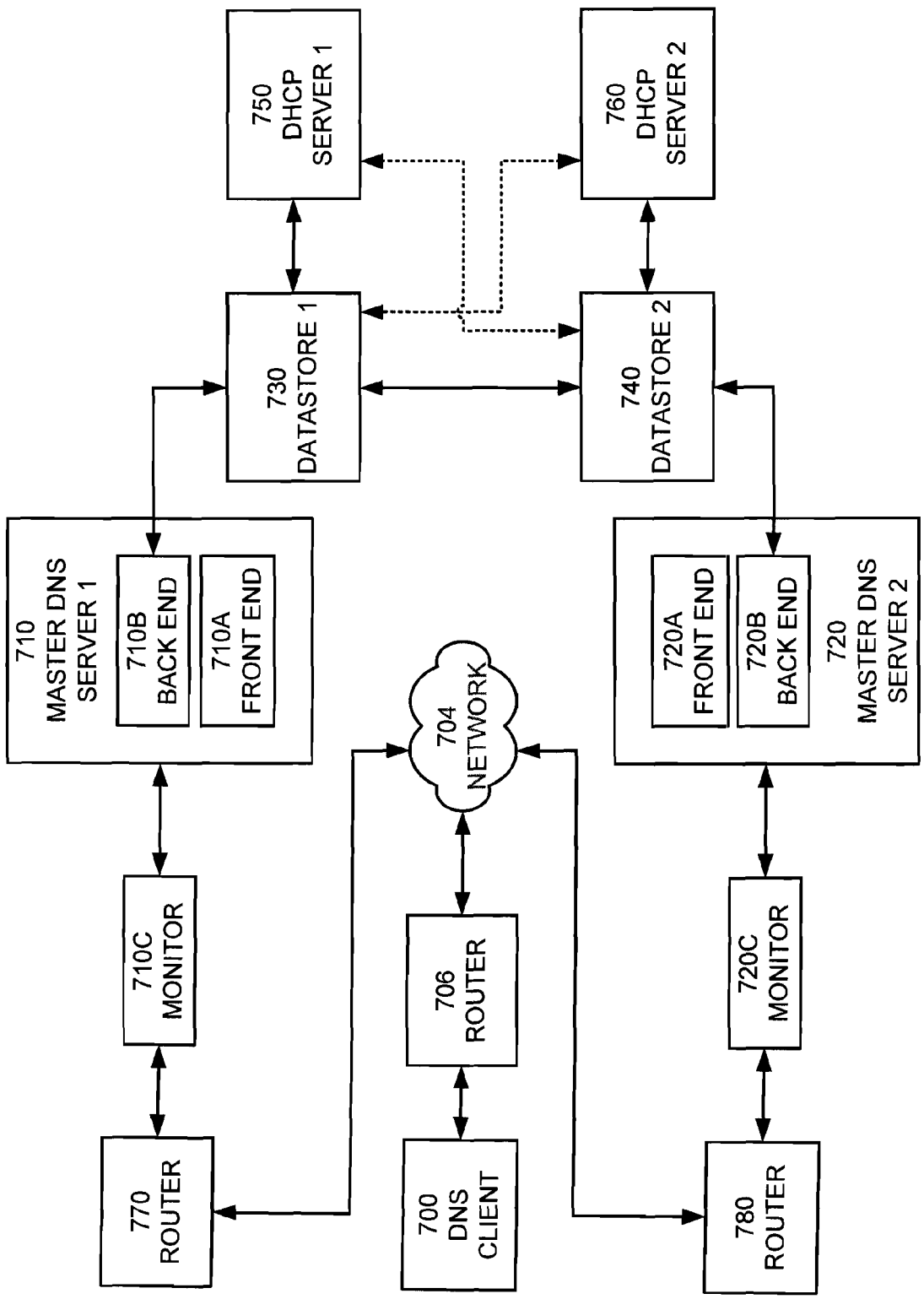

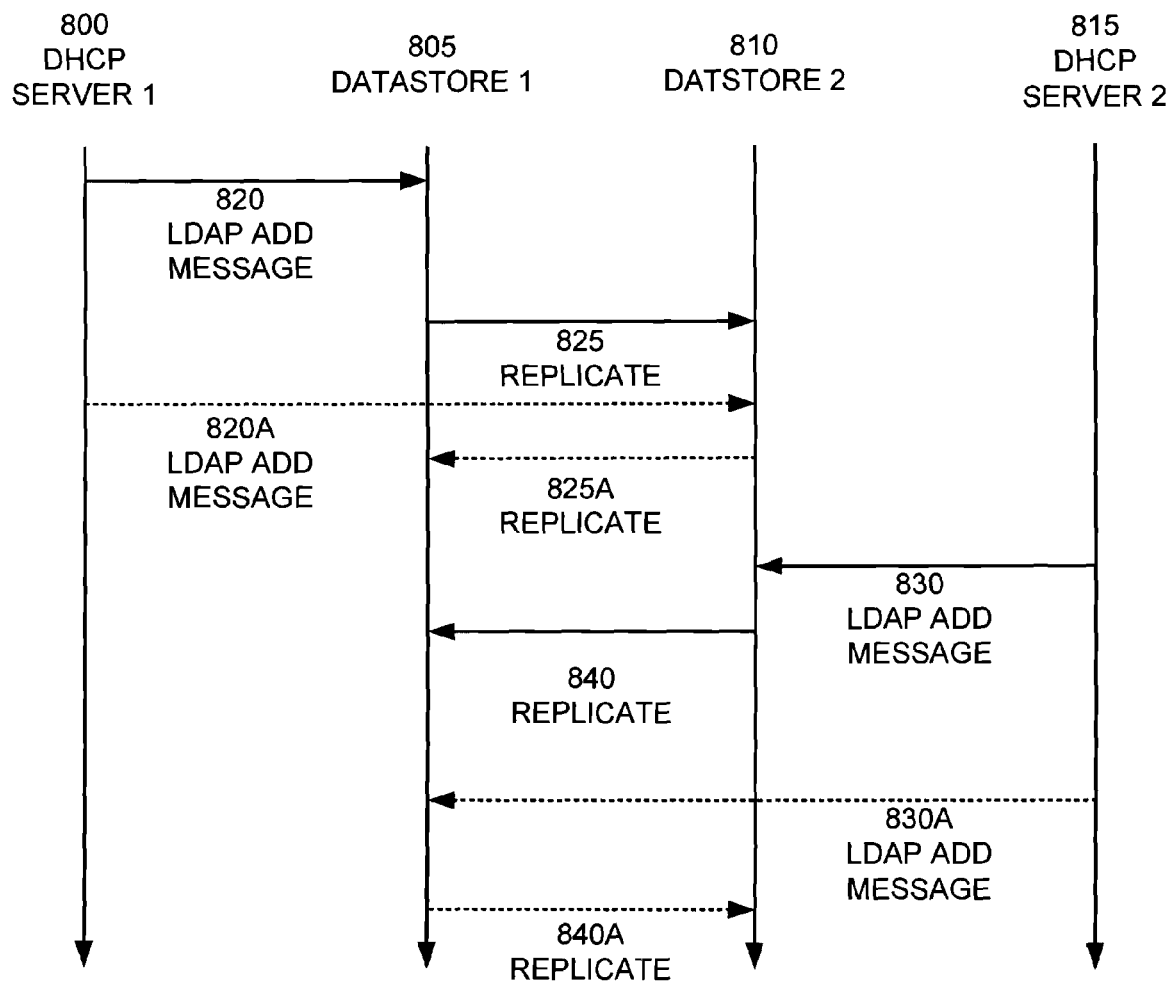

SYSTEM AND METHOD FOR UPDATING A DYNAMIC DOMAIN NAME SERVER

BACKGROUND AND SUMMARY

Dynamic Domain Name System (DDNS) is a critical architectural component of network systems. A domain name system may be analogized as an electronic telephone book that uses domain names to find IP addresses (IP lookup) and IP addresses to find domain names (domain name lookup).

Berkeley Internet Name Domain (BIND) is the most commonly used DNS server on the Internet, especially on Unix-like systems, where it is a de facto standard. While BIND provides many useful features, it imposes a number of architectural limitations on the DNS systems that use it. For example, BIND does not support multiple masters in the same zone. A zone is an individual domain, subdomain, or portion of the domain name system administered by the same authority. Additionally, BIND does not permit a secondary DNS server to update a primary DNS server. Some of the consequences of these limitations are described below.

FIG. 1 illustrates a simplified flow of an IP lookup. The IP lookup utilizes a query-response exchange. DNS client 100 issues a query 105 for the IP address of "example.com" to DNS server 120. DNS server 120 sends a response 110 comprising the address "192.0.2.1."

IP addresses are typically issued dynamically by a dynamic host configuration protocol (DHCP) server. The IP address is issued in the form of a "lease" that has a specified expiration time and date. FIG. 2 illustrates an exchange between a client and DHCP server. The DHCP client 230 broadcasts a DHCP discover message 200 that is received by DHCP server 240. DHCP server 240 replies with a DHCP offer 205 comprising an IP address. The DHCP client 230 responds with a DHCP request 210 accepting the DHCP offer 205 and the DHCP server 240 responds with a DHCP acknowledgement 215 comprising the IP address. At some point in time, the DHCP client 230 indicates that it is releasing the IP address by sending a DHCP release message 220. The DHCP client 230 is responsible for renewing the lease before the expiration date and time.

The domain name system can be updated dynamically by connecting a DNS server to a DHCP server. FIG. 3 illustrates the message flow of a dynamic domain name system in which the DHCP server 240 sends a DNS update message 305 to DDNS server 300 following the issuance on an IP address to a client (as indicated by the acknowledgement message 215 sent by the DHCP server 240 to the DHCP client 230). When the client releases the IP address, a DNS update message 310 is sent to the DDNS server.

Given the importance of the domain name system, the system is structured with multiple redundancies. FIG. 4 illustrates that the flow of updates is from a primary (or master) DNS server to a secondary DNS server in a dynamic DNS system implementing BIND. This flow is unidirectional. DHCP server 400 sends a DNS update message 415 to primary DNS server 405. Primary DNS server 405 sends a response 420 to DHCP server 400 and a DNS update message 425 to secondary DNS server 410. In this configuration, secondary DNS server 410 cannot receive a DNS update directly from DHCP server 400 and cannot update a primary DNS server.

FIG. 5 illustrates a consequence of this architecture. If the primary DNS server 505 is unreachable, the DNS update message 515 from DHCP server 500 will not be received by the primary DNS server 505. Thus, secondary DNS server 510 cannot be updated even though it is fully operable because communication from DHCP server 500 directly to secondary DNS server 510 is prohibited.

FIG. 6 illustrates a modified flow in which the DNS update is sent directly from the DHCP server to the secondary DDNS server. As illustrated, DHCP server 600 sends a DNS update message 615 to primary DNS server 605. However, because primary DNS server 605 is "down," the DNS update message 615 is not received by primary DNS server 605. DHCP server 600 then sends a DNS update message 620 to secondary DNS server 610. Secondary DNS server 610 sends a response message 625 to DHCP server 600 acknowledging the update message 620. However, BIND does not support multiple masters for the same zone, and this flow is not supported by current DHCP servers that cooperate with a BIND server. Even if this functionality could be added, the domain name system does not support updating a master server from a secondary server. Providing the updating functionality to a secondary server would violate this rule. (See, RFC 2136—Dynamic Updates in the Domain Name System (DNS UPDATE) April 1997). Additionally, after primary DNS server 605 returns to an operational state, DHCP clients that send a lookup query to master server 1 for the domain name that was updated by DHCP server 600 would either receive a "not found" response or would receive outdated information.

A partial solution to this problem is to use BGP (border gateway protocol) and the anycast protocol. Anycast is a network addressing and routing scheme whereby data is routed to a "best" destination as viewed by the routing topology. The "best" destination is determined by BGP implementation. BGP is an inter-autonomous system routing protocol. Routes learned via BGP have associated properties that are used to select a route to a destination when multiple paths exist to that destination. These properties are referred to as BGP attributes.

In the anycast/BGP solution, all DNS servers have the same IP address. The DNS client utilizes an anycast IP address that directs the lookup request to a router. The router then directs the lookup request to an available DNS server based on the assigned BGP attributes. This allows a DNS client to use a single IP address to contact one of a number of available anycast DNS servers.

While the anycast/BGP solution solves many of the client-side problems associated with domain name systems, the solution is not suited for dynamic domain name systems. Anycast works well with short transaction times, but as transaction times increase so does the potential that a route may change during the transaction. For this reason, anycast cannot be reliably used to update multiple master servers in a dynamic DNS system.

What is needed is a dynamic DNS system in which multiple master servers are capable of processing updates from DHCP servers as long as at least one master server is online and in which when an offline server comes online it is automatically updated with the most current DNS information.

DESCRIPTION OF THE DRAWINGS

FIG. 7 illustrates the logical components of a multi-master dynamic domain name system according to an embodiment hereof.

FIG. 8 illustrates a replication flow of a multi-master dynamic domain name system according to an embodiment hereof.

DETAILED DESCRIPTION

Figure 1:
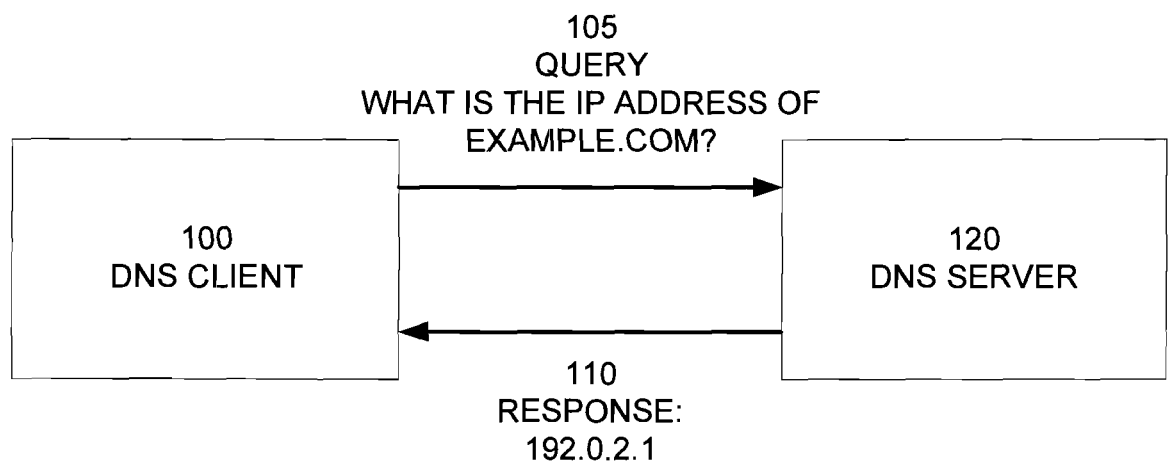
FIG. 1 illustrates a simplified message flow of an IP lookup.
Figure 2:
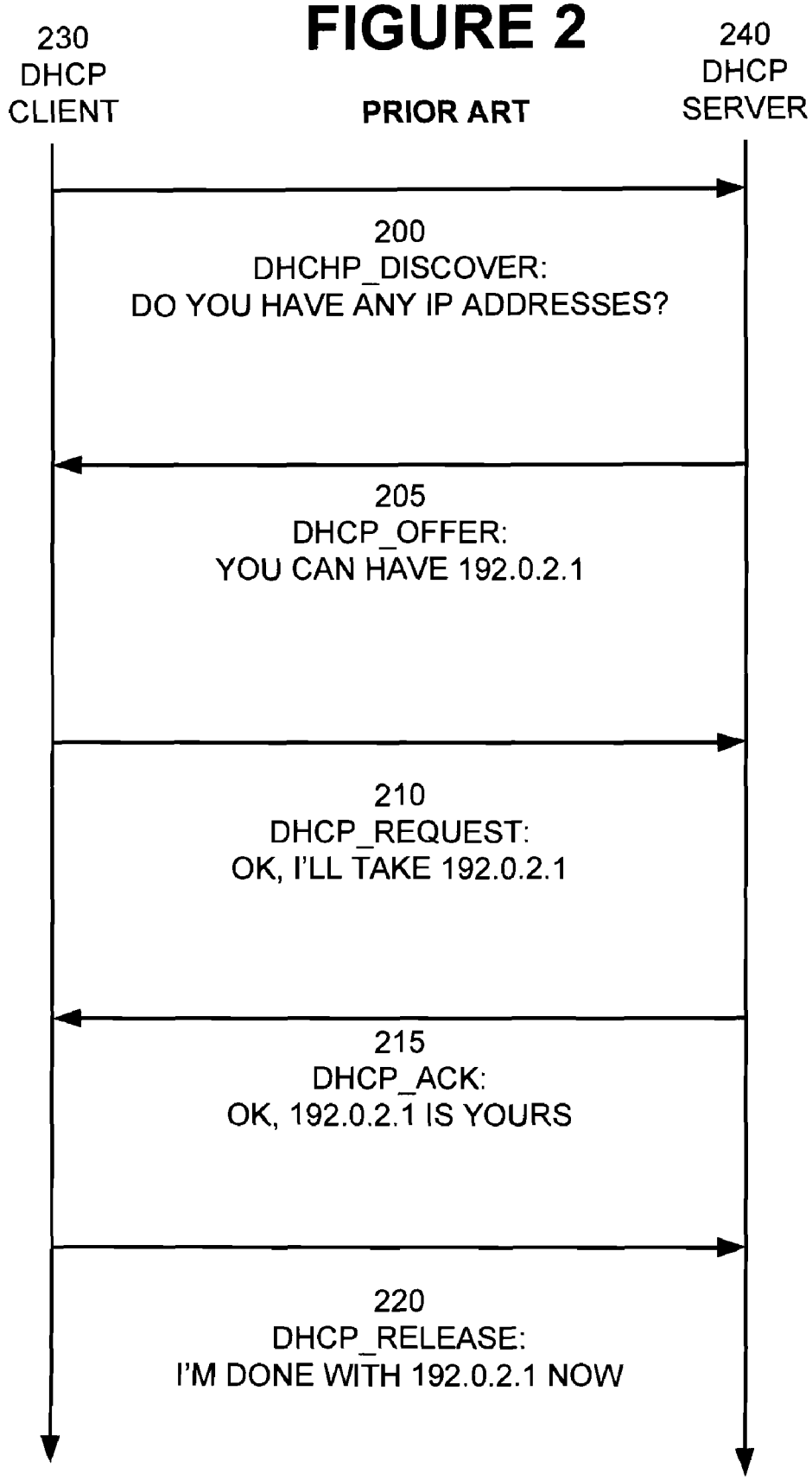
FIG. 2 illustrates a message flow between a client and DHCP server.
Figure 3:
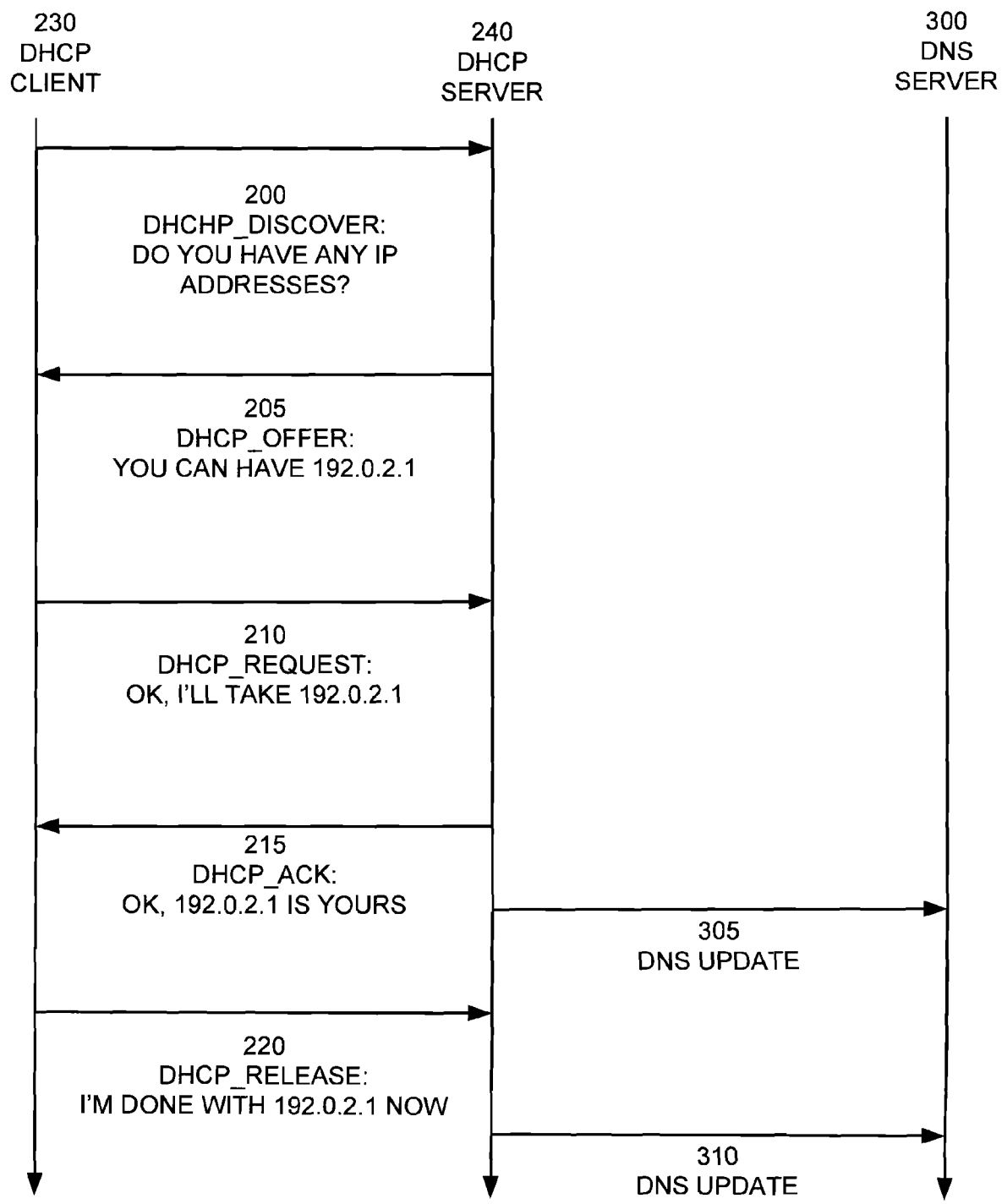
FIG. 3 illustrates a message flow of a dynamic domain name system.
Figure 4:
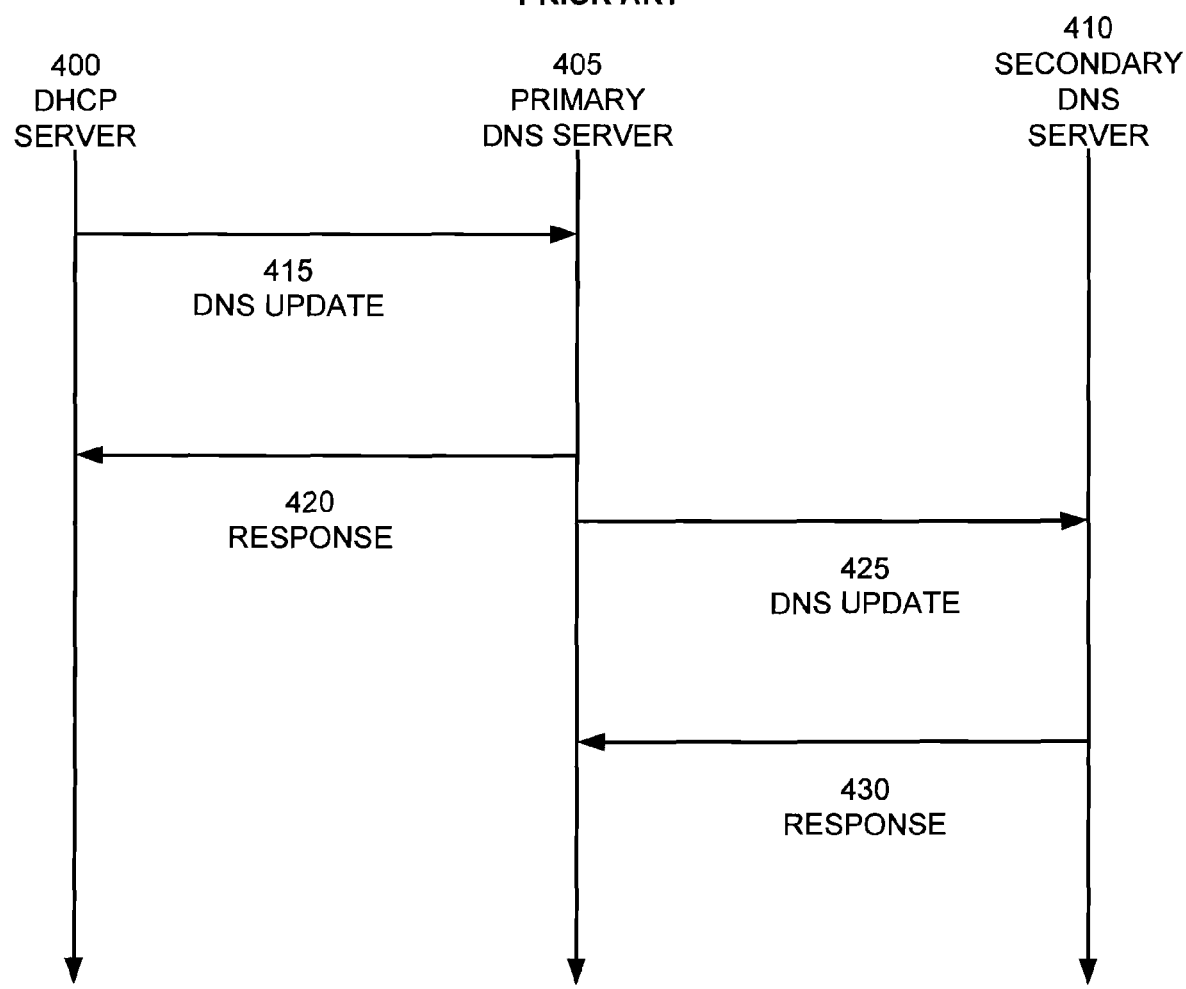
FIG. 4 illustrates a message flow of updates from a primary (or master) DDNS server to a secondary DDNS server.
Figure 5:
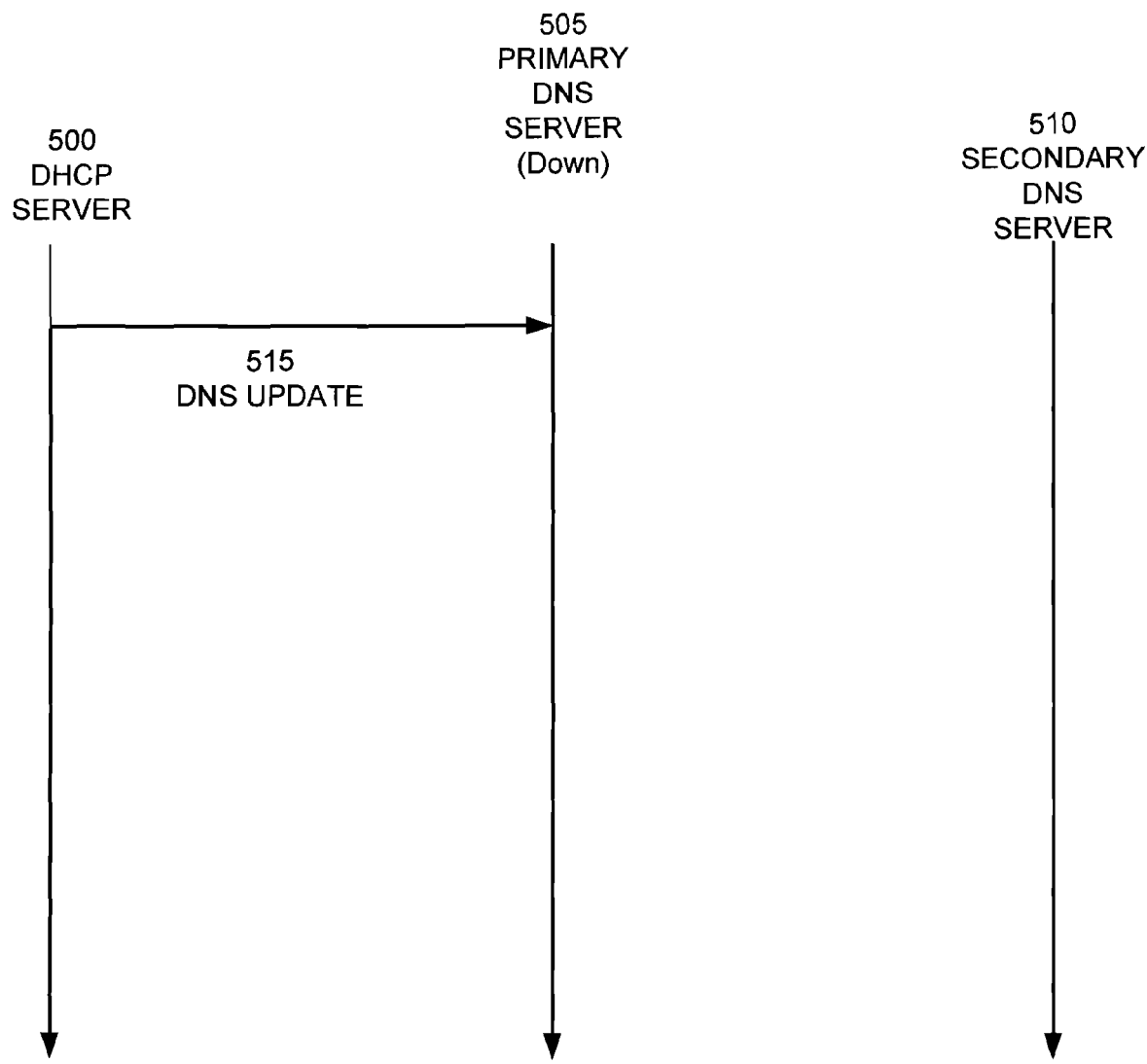
FIG. 5 illustrates a consequence of the architecture illustrated in FIG. 4.
Figure 6:
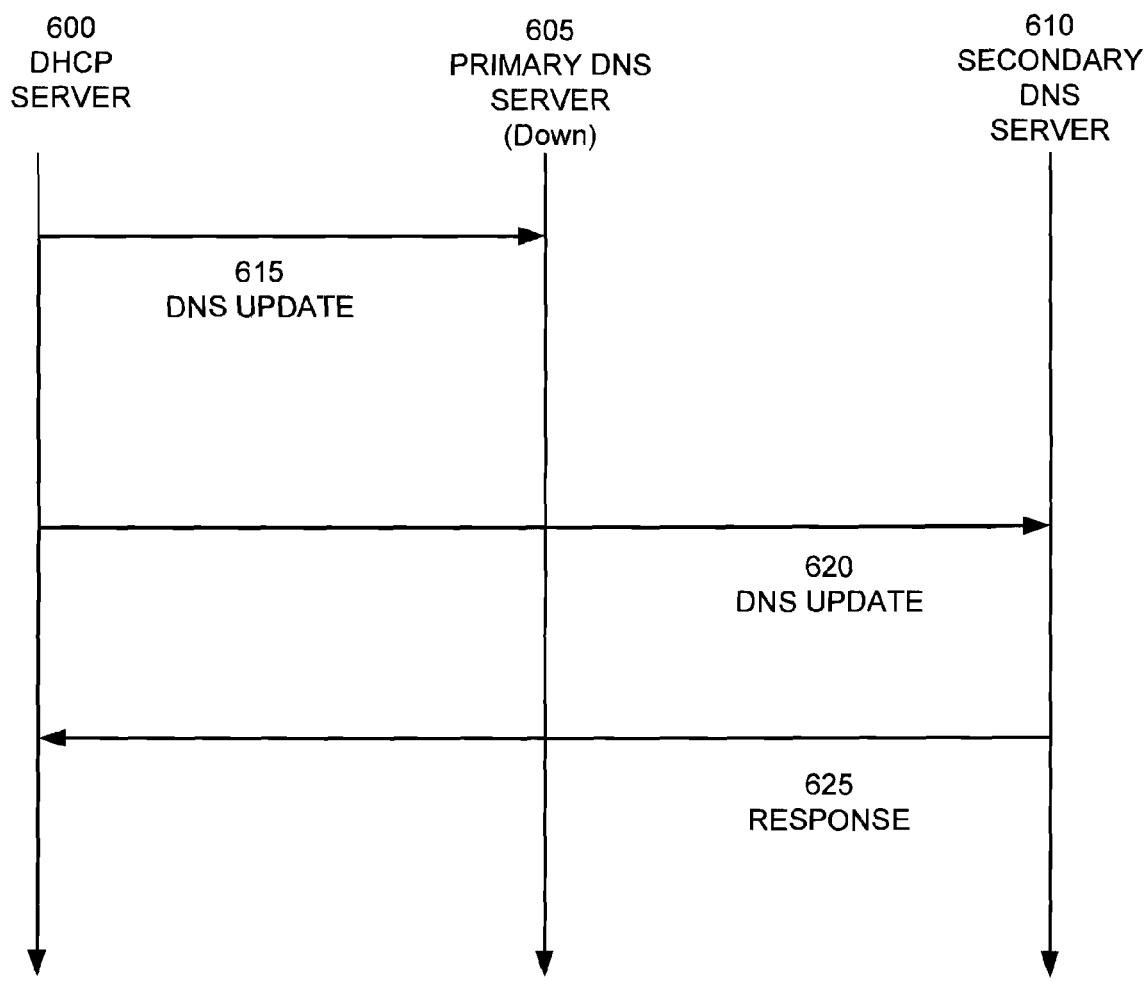
FIG. 6 illustrates a modified message flow in which the DNS update is sent directly from a DHCP server to a secondary DDNS server.

FIG. 7 illustrates the logical components of a multi-master dynamic domain name system according to an embodiment hereto. In this embodiment, multiple master DNS servers 710 and 720 are assigned the same IP address. Master DNS server 710 comprises front end 710A and back end 710B. Master DNS server 1 710 is linked to datastore 1 730. Datastore 1 730 is linked to DHCP server 1 750. In an embodiment, the front end 710A is an instance of the BIND software. However, this is not meant as a limitation. The front end 710A may be any software that is capable of responding to domain name query messages.

Master DNS 2 server 720 comprises front end 720A and back end 720B. Master DNS server 2 720 is linked to datastore 2 740. Datastore 2 740 is linked to DHCP server 2 760. In an embodiment, the front end 720A is an instance of the BIND software. However, this is not meant as a limitation. The front end 720A may be any software that is capable of responding to domain name query messages.

DHCP server 1 750 is also linked to DHCP server 2 760.

Master DNS 1 server 710 communicates with monitor 710C. Monitor 710C monitors the availability of DNS 1 server 710 to receive and respond to DNS requests and reports this availability to router 770. While monitor 710C is illustrated as a distinct component of the multi-master dynamic domain name system illustrated in FIG. 7, this is not meant as a limitation. For example, the functions of monitor 710C may be physically located in either DNS 1 server 710 or router 770.

Master DNS 2 server 720 communicates with monitor 720C. Monitor 720C monitors the availability of DNS 1 server 720 to receive and respond to DNS requests and reports this availability to router 780. While monitor 720C is illustrated as a distinct component of the multi-master dynamic domain name system illustrated in FIG. 7, this is not meant as a limitation. For example, the functions of monitor 720C may be physically located in either DNS 1 server 720 or router 780.

In an embodiment, routers 770 and 780 are BGP routers. However, this is not meant as a limitation. Other routing protocols, such as, for example, open shortest path first (OSPF), may be used.

Router 770 reports the availability of a route to master DNS server 1 710 to router 706. In an embodiment, router 706 is a BGP router. However this is not meant as a limitation. Other routing protocols, such as for example, open shortest path first (OSPF), may be used.

Router 780 reports the availability of a route to master DNS server 2 720 to router 706. A DNS client 700 issues a DNS lookup request over network 704 to a specified shared IP address in the form of an "anycast" message. Router 706 determines which master DNS server is to receive the request and directs the request to the appropriate server via network 704. Route selection may be based on availability of a DNS server, network loading, and other criteria. For discussion purposes, it will be assumed that the request is directed to DNS server 710.

The request is received by "front end" 710A of DNS server 710. The query is processed and referred to the "back end" 710B of DNS server 710. Datastore 1 730 is searched for the network address associated with the domain name identified in the query. The domain name is returned to the front end 710A and sent to DNS client 700 via network 704.

DHCP server 1 750 provides dynamic IP address updates to datastore 1 730. DHCP server 2 760 provides dynamic IP address updates to datastore 2 740. In an embodiment, datastores 1 and 2 (730 and 740) are servers operating the lightweight directory application protocol (LDAP). However, this is not meant as a limitation. Other protocols that are capable of performing the functions assigned to datastores 1 and 2 (730 and 740) may be used.

Datastores 1 and 2 (730 and 740) are configured such that the updates received by one datastore are updated to the other. If a datastore is unreachable, the operating datastore holds the updates for the "down" datastore until it is back in service. Additionally, the router 706 "knows" the availability of master DNS servers 710 and 720 to receive DNS queries. Domain name requests from DNS client 700 will not be routed to a master DNS server that is not able to respond to the request.

FIG. 7 illustrates a simplified architecture of a multi-master dynamic domain name system. It is anticipated that numerous master DNS servers and datastores will be utilized to provide the functionality described herein. Additionally, while FIG. 7 illustrates the logical components of a multi-master dynamic domain name system, the illustration is not meant to be limiting. Functional elements may be consolidated into single devices or distributed across a number of devices. For example, a master DNS server and a datastore may be incorporated into a single computing device.

FIG. 8 illustrates a replication flow of a multi-master dynamic domain name system according to an embodiment. DHCP server 1 800 updates an IP address for a device (not illustrated). An LDAP add message 820 is sent from DHCP server 1 800 to datastore 1 805. Assuming that datastore 1 805 was reachable, datastore 1 805 then sends a replicate message 825 to datastore 2 810. The replicate message conveys the updated IP address issued by DHCP server 1 800 to a network device (not shown). If datastore 2 810 is unreachable, datastore 1 800 holds the DNS update information until such time as communications with datastore 2 810 are restored.

If datastore 1 805 was not reachable when DHCP server 1 800 sent the LDAP add message 820, then DHCP server 1 800 utilizes a failsafe connection (illustrated as a dotted line in FIG. 7) to send the LDAP add message 820A to datastore 2 810. Datastore 2 810 holds the DNS update information until such time as communications with datastore 1 805 are restored. At that time, datastore 2 810 sends a replicate message 825A to datastore 1 805 to convey the updated DNS information to datastore 1 805.

DHCP server 2 815 updates an IP address for a device (not illustrated). An LDAP add message 830 is sent from DHCP server 2 815 to datastore 2 810. Assuming that datastore 2 810 was reachable, datastore 2 810 then sends a replicate message 840 to datastore 1 805. The replicate message conveys the updated IP address issued by DHCP server 2 815 to a network device (not shown). If datastore 1 805 is unreachable, datastore 2 810 holds the DNS update information until such time as communications with datastore 1 805 are restored.

If datastore 2 810 was not reachable when DHCP server 2 815 sent the LDAP add message 830, then DHCP server 2 815 utilizes a failsafe connection (illustrated as a dotted line in FIG. 7) to send the LDAP add message 830A to datastore 1 805. Datastore 1805 holds the DNS update information until such time as communications with datastore 2 810 are restored. At that time, datastore 1 805 sends a replicate message 840A to datastore 2 810 to convey the updated DNS information to datastore 2 810.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular. Moreover, a reference to a specific time, time interval, and instantiation of scripts or code segments is in all respects illustrative and not limiting.

What is claimed is:

1. A synchronized dynamic domain name system (DDNS) comprising:
    a first master DDNS server device connected to a first master datastore, wherein the first master datastore comprises domain name information and wherein the first master datastore is configured to receive updated domain name information;
    a second master DDNS server device connected to a second master datastore, wherein the second master datastore comprises the domain name information, wherein the second master data store is configured to receive updated domain name information and wherein the first and second DDNS server devices share an IP address;
    wherein the first master datastore comprises instructions for receiving first updated domain name information and sending the first updated domain name information to the second master datastore; and
    wherein the second master datastore further comprises instructions for receiving second updated domain name information and sending the second updated domain name information to the first master datastore;
    a first monitor connected to the first master DNS server and the network, wherein the first monitor comprises instructions for:
       determining whether the first master server is available to respond to a request for domain name information; and
       generating the availability information based on the availability of the first master DNS server;
    a second monitor connected to the second master DNS server and the network, wherein the second monitor comprises instructions for:
       determining whether the second master DNS server is available to respond to the request for domain name information; and
       generating the availability information based on the availability of the second master DNS server; and
    a network accessible to the first and second master DDNS server devices, wherein the network comprises routers comprising instructions for:
       receiving availability information from the first and second monitors relating to the availability of the first and second master DDNS server devices to receive packets;
       receiving requests for domain name information;
       routing packets comprising the request for domain name information to a master DDNS server device selected from an available one of the first and second master DDNS server devices using a shared IP address based on the availability information;
    wherein the first master DDNS server device further comprises:
       the shared IP address;
       instructions for receiving the request for domain name information;
       instructions for retrieving the requested domain name information from the first master datastore; and
       instructions for generating a response to the request for domain name information, wherein the response comprises the requested domain name information, and
    wherein the second master DDNS server device comprises:
       the shared IP address;
       instructions for receiving the request for domain name information from the router;
       instructions for retrieving the requested domain name information from the second master datastore; and
       instructions for generating a response to the request for domain name information, wherein the response comprises the requested domain name information.

2. The synchronized dynamic DDNS of claim 1, wherein the instructions for receiving the request for domain name information, the instructions for retrieving the requested domain name information, and the instructions for generating a response to the request for domain name information comprise an instance of a BIND software application.

3. The synchronized dynamic DDNS of claim 1, wherein the first and second master datastores operate an LDAP protocol.

4. The synchronized dynamic DDNS of claim 1,
    wherein the first master datastore further comprises instructions for:
       prior to sending the first updated domain name information to the second master datastore, determining whether the second master datastore is available to receive the first updated domain name information;
       if the second master datastore is not available to receive the first updated domain name information, then waiting until the second master datastore is available to receive it; and
       sending the first updated domain name information to the second master datastore when the second master datastore is available to receive it, and
    wherein the second master datastore further comprises instructions for:
       prior to sending the second updated domain name information to the first master datastore, determining whether the first master datastore is available to receive the second updated domain name information;
       if the first master datastore is not available to receive the second updated domain name information, then waiting until the first master datastore is available to receive it; and
       sending the second updated domain name information to the first master datastore when the first master datastore is available to receive it.

5. The synchronized dynamic DDNS of claim 1 further comprising:
    a first DHCP server device, wherein the first DHCP server device comprises instructions for:
       creating the first updated domain name information;

sending the first updated domain name information to the first master datastore if the first master datastore is available to receive it; and sending the first updated domain name information to the second master datastore if the first master datastore is not available to receive it.

6. The synchronized dynamic DDNS of claim 5, wherein the second master datastore further comprises instructions for:

if the second master datastore receives the first updated domain name information from the first DHCP server device, then determining when the first master datastore is available to receive the first updated domain name information; and sending the first updated domain name information to the first master datastore when the first master datastore is available to receive it.

7. The synchronized dynamic DDNS of claim 1 further comprising:

a second DHCP server device, wherein the second DHCP server device comprises instructions for:

creating the second updated domain name information;

sending the second updated domain name information to the second master datastore if the second master datastore is available to receive it; and sending the second updated domain name information to the first master datastore if the second master datastore is not available to receive it.

8. The synchronized dynamic DDNS of claim 7, wherein the first master datastore further comprises instructions for:

if the first master datastore receives the second updated domain name information from the second DHCP server device, then determining when the second master datastore is available to receive the second updated domain name information; and sending the second updated domain name information to the second master datastore when the second master datastore is available to receive it.

9. The synchronized dynamic DDNS of claim 1, wherein the request for domain name information is sent from a DDNS client connected to the network, wherein the first master DDNS server device further comprises instructions for sending the response to the DDNS client, and wherein the second master DDNS server device further comprises instructions for sending the response to the DDNS client.

10. A method for synchronizing a dynamic domain name system (DDNS) comprising:

receiving, at a first master datastore, first updated domain name information;

sending, from the first master datastore, the first updated domain name information to a second master datastore;

receiving, at the second master datastore, second updated domain name information;

sending, from the second master datastore, the second updated domain name information to the first master datastore;

receiving, at a network router, packets comprising a request for domain name information;

determining, at a first monitoring device, whether the first master server is available to respond to a request for domain name information;

reporting, from the first monitoring device, the availability of the first master DNS server to the network router;

determining, at a second monitoring device, whether the second master server is available to respond to a request for domain name information;

reporting, from the second monitoring device, the availability of the second master DNS server to the network router;

determining, at the network router, whether at least one of the first and second master servers is available to respond to the request for domain name information, wherein the first and second master servers share an IP address, wherein the first master DDNS server device is connected to the first master datastore, and wherein the second master DDNS server device is connected to the second master datastore;

routing, to a master DDNS server device selected from an available one of the first and second master DDNS server devices, the packets comprising the request for domain name information using the shared IP address;

retrieving, from the master datastore connected to the selected master DDNS server device, the requested domain name information; and generating, at the selected master DDNS server device, a response to the request for domain name information, wherein the response comprises the requested domain name information.

11. The method for synchronizing a dynamic DDNS of claim 10, wherein receiving the request for domain name information, retrieving the requested domain name information, and generating a response to the request for domain name information is performed by an instance of a BIND software application.

12. The method for synchronizing a dynamic of claim 10, wherein the first and second master datastores operate an LDAP protocol.

13. The method for synchronizing a dynamic DDNS of claim 10 further comprising:

determining, at the first master datastore, whether the second master datastore is available to receive the first updated domain name information prior to sending the first updated domain name information to the second master datastore;

determining, at the first master datastore, to wait until the second master datastore is available to receive the first updated domain name information when the second master datastore is not available to receive the first updated domain name information;

determining, at the first master datastore, to send the first updated domain name information to the second master datastore when the second master datastore is available to receive it;

determining, at the second master datastore, whether the first master datastore is available to receive the second updated domain name information prior to sending the second updated domain name information to the first master datastore;

determining, at the second master datastore, to wait until the first master datastore is available to receive the second updated domain name information when the first master datastore is not available to receive the second updated domain name information; and determining, at the second master datastore, to send the second updated domain name information to the first master datastore when the first master data store is available to receive it.

14. The method for synchronizing a dynamic DDNS of claim 10 further comprising:

creating, at a first DHCP server device the first updated domain name information;

sending, from the first DHCP server device, the first updated domain name information to the first master datastore when the first master datastore is available to receive it; and sending, from the first DHCP server device, the first updated domain name information to the second master datastore when the first master datastore is not available to receive it.

15. The method for synchronizing a dynamic DDNS of claim 14 further comprising:

determining, at the second master datastore, whether the first master datastore is available to receive the first updated domain name information when the second master datastore receives the first updated domain name information from the first DHCP server device; and sending, for the second master datastore, the first updated domain name information to the first master datastore when the first master datastore is available to receive it.

16. The method for synchronizing a dynamic DDNS of claim 10 further comprising:

creating, at a second DHCP server device, the second updated domain name information;

sending, from the second DHCP server device, the second updated domain name information to the second master datastore when the second master datastore is available to receive it; and sending, from the second DHCP server device, the second updated domain name information to the first master datastore if the second master datastore is not available to receive it.

17. The method for synchronizing a dynamic DDNS of claim 16 further comprising:

determining, at the first master datastore, whether the second master datastore is available to receive the first updated domain name information when the first master datastore receives the second updated domain name information from the second DHCP server device; and sending, from the first master datastore, the second updated domain name information to the second master datastore when the second master datastore is available to receive it.

18. The method for synchronizing a dynamic DDNS of claim 10 further comprising:

sending, from a DDNS client, a request for domain name information from a DDNS client; and sending, from the selected DDNS master server, the response to the DDNS client.

* * * * *